United States Patent [19]

Swan

[11] Patent Number: 5,172,680
[45] Date of Patent: Dec. 22, 1992

[54] DUST REMOVAL KIT FOR MASONRY TABLE-SAW

[75] Inventor: Leo Swan, Frederick, Md.

[73] Assignee: Equipment Development Co., Inc., Frederick, Md.

[21] Appl. No.: 774,806

[22] Filed: Oct. 11, 1991

[51] Int. Cl.$^5$ .......................... B28D 7/02; B28D 1/04
[52] U.S. Cl. .................................. 125/12; 125/13.03; 51/268; 51/273; 83/100
[58] Field of Search .............. 125/12, 13.01, 13.02, 125/13.03, 14, 15; 51/268, 270, 272, 273; 83/100, 168; 144/252 R, 252 A; 30/124, 391

[56] References Cited

U.S. PATENT DOCUMENTS

| | | | |
|---|---|---|---|
| 2,516,839 | 8/1950 | Allen, Jr. et al. | 51/268 |
| 2,565,510 | 8/1951 | Martin | 51/273 |
| 3,311,103 | 3/1967 | Simson | 125/13.03 |
| 3,401,724 | 9/1968 | Kreitz | 51/273 |
| 3,568,567 | 3/1971 | Seck | 51/268 X |
| 4,144,781 | 3/1979 | Kreitz | 83/100 |
| 4,446,845 | 5/1984 | Harding . | |
| 4,875,398 | 10/1989 | Taylor et al. | 83/100 |

OTHER PUBLICATIONS

"A Catcher for Flying Sawdust", Mechanix Illustrated, Oct. 1977, p. 158.

Primary Examiner—M. Rachuba
Assistant Examiner—John A. Marlott

[57] ABSTRACT

A table-top masonry saw comprising a high-speed rotary circular blade is provided with a dust removal kit for withdrawing masonry dust created by the circular blade from the region of the saw to a vacuum source. The kit includes a curtain draped over a frame member at an operator's side of the saw blade and a funnel disposed to the rear of the saw blade opposite the operator's side. The funnel includes an exhaust duct which is connected to a vacuum source.

1 Claim, 2 Drawing Sheets

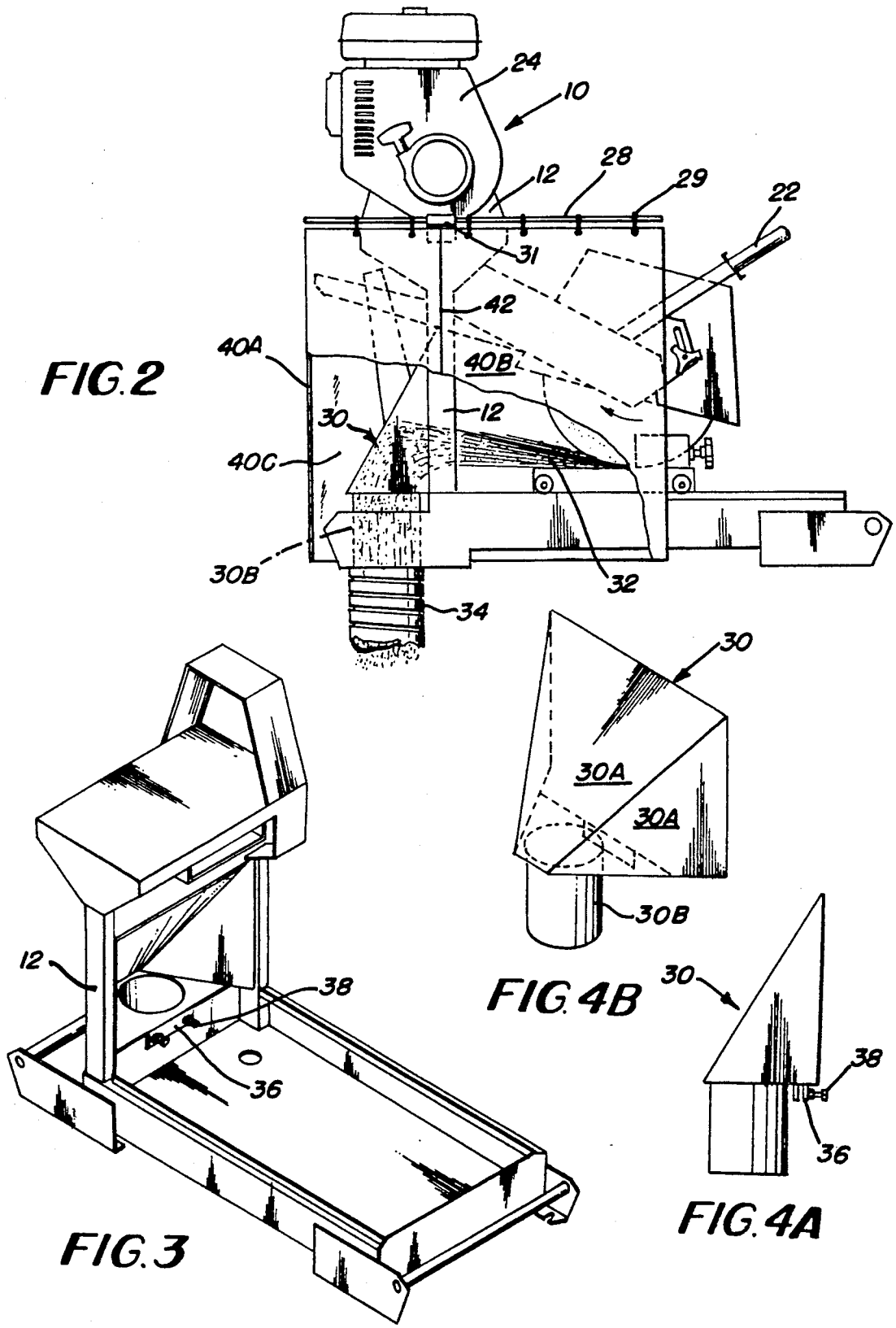

DUST REMOVAL KIT FOR MASONRY TABLE-SAW

BACKGROUND OF THE INVENTION

The present invention relates to a masonry saw for cutting masonry blocks or the like supported on a table. More specifically, the present invention relates to a masonry table-saw in combination with a dust removal kit for collecting masonry dust generated by a rotary circular blade while the blade cuts or abrades a workpiece supported on a work table of the saw.

Masonry table-saws are generally known wherein a rotary circular blade is pivotally connected to the frame of the saw for cutting masonry blocks supported on a work table. These saws are electric or gasoline powered and include a suitable drive train for imparting high speed rotation to the circular cutting blade. A saw of this general type is disclosed in prior U.S. Pat. No. 4,446,845 to Harding issued May 8, 1984.

Due to the high rotary speed of the cutting blade, masonry saws of this type generate extraordinary amounts of masonry dust during a cutting operation. This masonry dust will of course contaminate the immediate environment around the saw and present a potential health hazard to the operator of the saw.

In recent years the Environmental Protection Agency has recognized a need for collecting and removing the dust from the vicinity of these saws in an effective and efficient manner to preclude contamination of the environment and resulting potential health hazards.

SUMMARY OF THE INVENTION

Accordingly, it is a primary object of the present invention to provide a dust removal kit for a table-type masonry saw which will preclude contamination of the environment in which the saw is operated.

Another object of the present invention is to provide an inexpensive dust removal kit for table-type masonry saws which may be easily retrofit to existing saws for effectively removing masonry dust.

It is still another object of the present invention to provide a dust removal kit for a table-top masonry saw which does not impede manipulation of the workpiece and saw blade by the operator of the saw.

The objects of the present invention are fulfilled by providing a dust removal kit for a masonry saw, said saw including a frame for supporting the saw on a horizontal surface, a rotary circular blade supported by said frame, and a motor and drive train for rotating said blade to cut or abrade a workpiece, said frame defining an operator station on one side therefor for accommodating a workpiece and a masonry dust discharge station at an opposite side thereof, said kit comprising:

a curtain connected to said frame and surrounding only three sides of the operator station defining a plenum chamber;

a funnel disposed at the dust discharge station at the opposite side of the frame from the operator station, the funnel having an input end in communication with the plenum defined by said curtain and an exhaust end; and vacuum means coupled to the exhaust end of said funnel for withdrawing masonry dust from the region of the workpiece in said plenum through said funnel as said workpiece is being cut or abraded.

The curtain of the present invention may simply be flexible fabric draped from a curtain frame which is coupled to an upstanding frame portion of the saw on the side of the upstanding frame which defines the operator station.

The funnel preferably includes converging sidewalls connected to an exhaust duct disposed on the opposite side of the upstanding frame from the operator station. The sidewalls converge into an exhaust duct of the funnel connected to a flexible hose which is in turn connected to a vacuum source such as a large commercial vacuum machine of a type well known in the art. The exhaust duct of the funnel is preferably aligned with the cutting edge of the rotary circular blade which is rotating in the direction of the exhaust duct. In this manner the rooster tail of masonry dust generated by the rapidly rotating circular blade is withdrawn through the exhaust duct to the vacuum means efficiently and effectively.

The curtain surrounding the operator station although open at the top, front and bottom provides a sufficient isolation of the ambient air surrounding the workpiece and the rotating blade to create a plenum chamber in which the suction force from the vacuum means imparted by the funnel on the backside of the saw creates the proper air flow pattern to withdraw the masonry dust in the rooster tail through the funnel to the vacuum means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 2 is a partial side elevational view looking at the left side of FIG. 1 illustrating the dust removal kit of the present invention attached to the masonry saw of FIG. 1;

FIG. 3 is a perspective view illustrating how the funnel of the kit is connected to the saw frame;

FIG. 4A is a side elevational view of the funnel; and

FIG. 4B is a rear perspective view of the funnel.

DETAILED DESCRIPTION OF PREFERRED EMBODIMENTS

Figure 1:
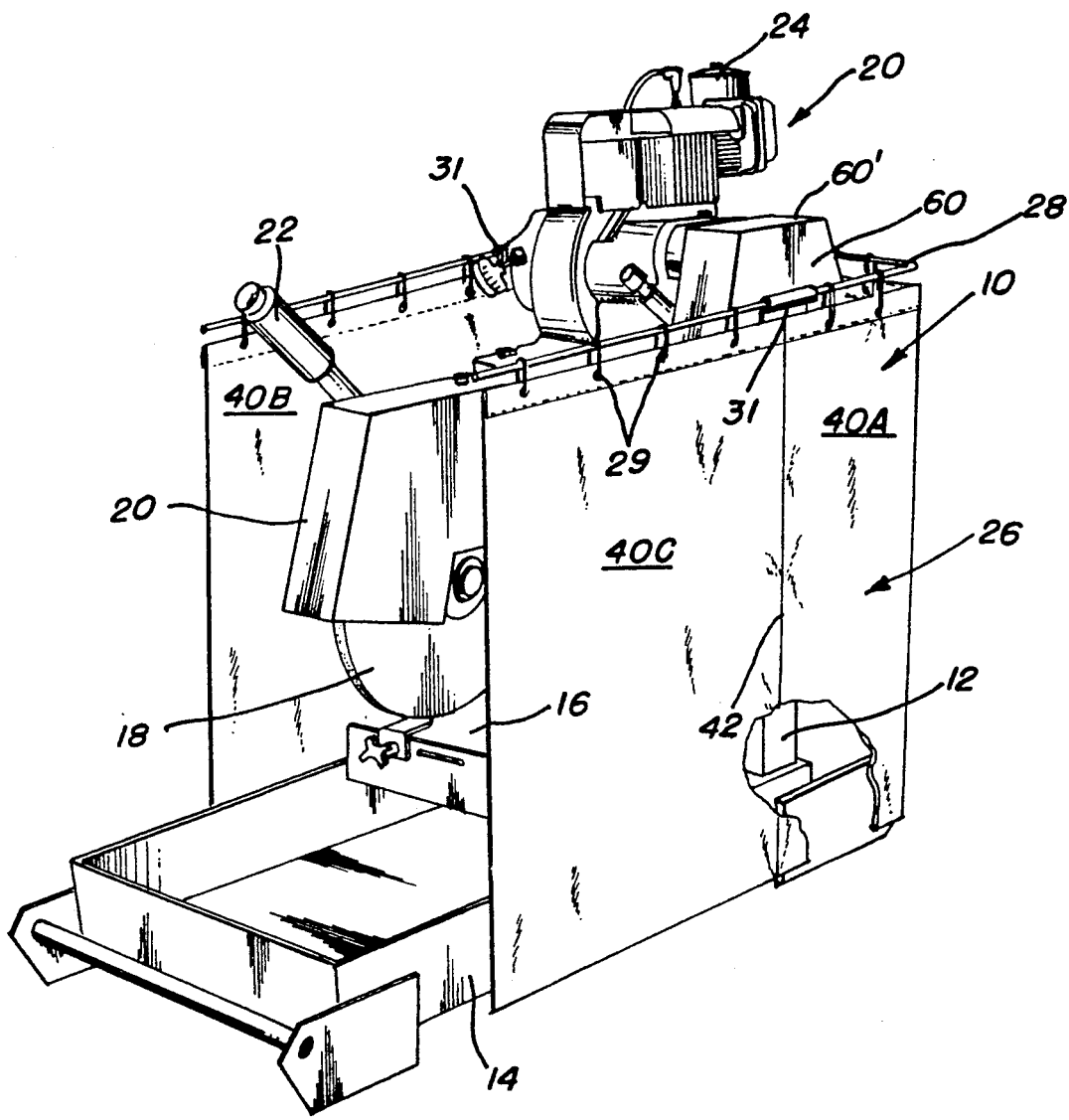
FIG. 1 is a perspective view illustrating the dust removal kit of the present invention attached to a conventional table-top masonry saw such as the one described in U.S. Pat. No. 4,446,845 to Harding issued May 8, 1984.

Referring to FIGS. 1 and 2 there is illustrated a table-top masonry saw 10 of the type described in the aforementioned U.S. Pat. No. 4,446,845 to Harding. The details of that saw are incorporated herein by reference. The saw includes a base 14 for supporting the saw on a table-top or other horizontal surface and an upstanding frame 12. A worktable 16 is provided for supporting a workpiece such as a masonry block or the like. The saw includes a rotary circular blade 18 surrounded by a blade guard 20 driven by a gasoline engine 24 through a suitable drive train. The engine 24 imparts a high speed rotary motion to blade 18. The blade 18 is supported suitably on a frame which is hinged with respect to the upright frame 12 so that the blade 18 can be moved up or down by an operator by handle 22 to engage a masonry block supported on the worktable 16.

In FIG. 1 the area to the near side of the upstanding frame 12 is an operator station, where an operator of the saw can manipulate the workpiece on worktable 16, and the handle 22 of the saw to selectively engage the blade 20 with the workpiece being cut. Extending from upstanding frame 12 is a U-shaped frame 28 extending on the operator's station side of the frame and around the back of the saw. A flexible curtain 26 of fabric or the like is draped over the frame 28 such as by rings 29 and includes a rear wall 40A and sidewalls 40B, 40C which form a plenum therebetween which surrounds the rotating blade 18 and any workpiece being cut which is resting upon worktable 16.

The frame 28 for supporting the curtain is a U-shaped tubular member mounted in a pair of tubular sleeves 31 welded to the top left and right sidewalls of the vertical frame 12 of the saw. The open end of the U is on the operator's side of the saw and the closed end of the U is on the back side surrounding the area where the funnel to be described hereinafter connects to the back of the saw. The actual curtain is made of a canvas type fabric and is in three pieces. There are two side panels 40B, 40C beginning from the front portion of the operator's station and there is one rear curtain portion 40A which wraps around the back from the midpoint of the two respective sides. At the midpoint of the two respective sides along the seams of the joining curtain members is a strip of Velcro TM 42 so that the respective curtain sections can be secured together in a substantially airtight manner.

As best illustrated in FIGS. 2, 3, 4A and 4B the rear side of upstanding frame 12 has a funnel 30 secured thereto for receiving a rooster tail of masonry dust 32 generated by rotating blade 18. The funnel 30 has converging sidewalls 30A which terminate in an exhaust duct 30B. The exhaust duct 30B is suitably connected through a flexible hose 34 to a remotely disposed vacuum source such as a commercially available vacuum machine.

The exhaust duct 30B of the funnel 30 is aligned with the longitudinal, central axis of the funnel but its axis is orthogonal with respect thereto and extends out of the bottom of the funnel to the vacuum hose 34. The funnel has a slotted bracket 36 which fits over part of the frame member 12 and has suitable screws 38 for quickly screwing the funnel to the frame so that it is easily retrofit to an existing saw. The saw can be a gasoline powered saw or an electric saw and the curtain and funnel components of the kit are designed so that it could be easily retrofit to either type of saw.

In operation the masonry saw 10 is turned on and blade 18 begins to rotate at a high speed. The blade 18 is then lowered into engagement with a workpiece supported on worktable 16 and a rooster tail of masonry dust 32 is generated as illustrated in FIG. 2. The vacuum source has also been turned on about the same time as the masonry saw and creates a flow of air currents from the plenum defined with the curtain 26 into the funnel 30 and out exhaust duct 30B. Remarkable efficiency and effectiveness are achieved with the kit of the present invention despite the fact that the plenum defined at the operator's station surrounding the workpiece is open on three sides (the front, top and bottom). However, it has been found that this curtain provides sufficient isolation of the region surrounding the workpiece to effectively and efficiently exhaust substantially all of the masonry dust in the rooster tail 32 to the vacuum source through the funnel 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dust removal kit for a masonry saw, said saw including a frame for supporting the saw on a horizontal surface, a rotary circular blade supported by said frame, and a motor and drive train for rotating said blade to cut or abrade a workpiece, said frame defining an operator station on one side thereof for accommodating a workpiece and a masonry dust discharge station at an opposite side thereof, said kit comprising:

a flexible curtain supported by a curtain frame coupled to the frame of the masonry saw at the sides of the operator station and surrounding only three sides of the operator station defining a plenum chamber;

a funnel having an input end in communication with the plenum defined by said curtain and an exhaust end, said funnel disposed at the dust discharge station at the opposite side of the frame from the operator station and including sidewalls connected to and extending from the frame of the saw on the side of the dust removal station and converging toward an exhaust duct aligned with a cutting edge of the rotary circular blade; and vacuum means coupled to the exhaust end of said funnel for withdrawing masonry dust from the region of the workplace and said plenum through said funnel as said workpiece is being cut or abraded.

* * * * *